United States Patent [19]
Haas et al.

[11] Patent Number: 5,998,689
[45] Date of Patent: Dec. 7, 1999

[54] METHOD FOR RECYCLING CONTAMINATED METAL PARTS

[75] Inventors: Ernst Haas, Buckenhof; Nikolaus Neudert, Feucht; Roland Hofmann, Eckental, all of Germany

[73] Assignee: Siemens Aktiengesellschaft, Munich, Germany

[21] Appl. No.: 09/099,242

[22] Filed: Jun. 15, 1998

Related U.S. Application Data

[63] Continuation of application No. PCT/DE96/02307, Dec. 2, 1996.

[30] Foreign Application Priority Data

Dec. 14, 1995 [DE] Germany .......................... 195 46 789

[51] Int. Cl.$^6$ ................................ G21F 9/00; A62D 3/00; C22B 60/00; C22B 1/00; C22B 9/00
[52] U.S. Cl. .................................. 588/1; 588/11; 588/201; 75/393; 75/403; 75/581; 75/687
[58] Field of Search .............................. 75/581, 687, 393, 75/403; 588/201, 11, 10.46, 1; 976/DIG. 391, DIG. 394, DIG. 395

[56] References Cited

U.S. PATENT DOCUMENTS

| | | | |
|---|---|---|---|
| 4,591,454 | 5/1986 | Ohtsuka et al. | 252/626 |
| 5,348,567 | 9/1994 | Chappell | 75/10.66 |
| 5,640,702 | 6/1997 | Shultz | 588/1 |
| 5,731,564 | 3/1998 | Kujawa et al. | 219/121.36 |
| 5,750,822 | 5/1998 | Gotovchikov et al. | 588/11 |

FOREIGN PATENT DOCUMENTS

| | | |
|---|---|---|
| 2 346 819 | 10/1977 | France . |
| 2 479 540 | 10/1981 | France . |
| 2 484 126 | 12/1981 | France . |
| 2 546 332 | 11/1984 | France . |
| 33 18 377 A1 | 11/1984 | Germany . |
| 3418207 | 11/1985 | Germany .......................... G21F 9/28 |
| 2266002 | 10/1993 | United Kingdom .............. G21F 9/28 |

OTHER PUBLICATIONS

"Melting makes the most of scrap metals" (Laser), Nuclear Engineering, vol. 476, 1994, pp. 51–52.

"Recycling of metallic materials from the dismantling of nuclear plants" (Sappok), Nuclear Technology, vol. 56, No. 6, 1991, pp. 376–378.

International Publication No. 96/04663 (Haas), dated Feb. 15, 1996.

Japanese Patent Abstract No. 61–026898.

*Primary Examiner*—Gary P. Straub
*Assistant Examiner*—Melanie C. Wong
*Attorney, Agent, or Firm*—Herbert L. Lerner; Laurence A. Greenberg

[57] ABSTRACT

A method for recycling metal parts contaminated by radioactive elements, in particular by α-emitters, includes forming a melt and a slag from the metal parts and then separating the slag from the melt. The radioactive elements are oxidized prior to the formation of the melt and the slag. For that purpose, the contaminated metal parts are exposed to an oxygen-containing atmosphere for a period at a temperature below the melting temperature of the metal parts.

5 Claims, No Drawings

5,998,689

METHOD FOR RECYCLING CONTAMINATED METAL PARTS

CROSS-REFERENCE TO RELATED APPLICATION

This application is a continuation of International Application No. PCT/DE96/02307, filed on Dec. 2, 1996, which designated the United States.

BACKGROUND OF THE INVENTION

FIELD OF THE INVENTION

The invention relates to a method for recycling metal parts contaminated by radioactive elements, in particular by α-emitters, in which a melt and a slag are formed from the metal parts and the slag is then separated from the melt.

When dismantling as well as when operating nuclear facilities, large amounts of contaminated metal, in particular iron-containing scrap, are produced and have to be recycled or disposed of. It is customary to subject the scrap to a melt decontamination. The radioactive elements which the scrap contains are, for example, α-emitters, such as uranium, thorium, transuranium elements and/or alkaline-earth metals.

A method which includes a melt decontamination is known from German Published, Non-Prosecuted Patent Application DE 33 18 377 A1. In that method, the contaminated metal is melted, and a slagging agent is added to the melt which is formed. A slag which floats on the melt is then formed. Radioactive elements (e.g. uranium, neptunium and plutonium), which caused the contamination of the metal parts, accumulate in the slag. Thus, while the concentration of those elements in the slag increases, their concentration in the melt decreases. That is to be attributed to the fact that the solubility of the elements in question is greater in the slag than in the melt. Decontamination of the melt is thus achieved. The slag is later drawn off from the surface of the melt. Its volume is small as compared to the total volume of the melt and the slag. It is only that small volume of slag which has to be taken to final storage. Consequently, only a relatively small final storage capacity is required. The metal melt, which has a volume that is significantly greater than the volume of the slag, is decontaminated and can therefore be reused. For example, shaped metal parts may be produced from decontaminated metal.

Although the elements which caused the contamination of the metal parts are substantially removed from the metal melt by using the known melt decontamination, a further increase in the degree of decontamination is nevertheless desirable.

Published French Patent Application 2 479 540 discloses a method for the disposal of radioactive waste in which component parts of the waste are oxidized.

SUMMARY OF THE INVENTION

It is accordingly an object of the invention to provide a method for recycling radioactively contaminated metal parts, which overcomes the hereinafore-mentioned disadvantages of the heretofore-known methods of this general type and which removes elements that caused the radioactive contamination of the metal parts from the metal melt to an even greater extent than heretofore. It is therefore intended for a greater amount (volume or mass) of the radioactive elements to be removed from the melt and introduced into the slag.

With the foregoing and other objects in view there is provided, in accordance with the invention, a method for recycling metal parts contaminated by radioactive elements, in particular α-emitters, which comprises oxidizing radioactive elements by holding contaminated metal parts in an oxygen-containing atmosphere for a period at a temperature below a melting temperature of the metal parts; forming a melt and a slag from the metal parts after oxidizing the radioactive elements; and then separating the slag from the melt.

The temperature at which the oxidation occurs must be as high as possible, i.e. only slightly below the melting temperature, in order to ensure that on one hand, no melt is yet formed during the oxidation and on the other hand, oxidation which is as complete as possible is made possible. The oxidation process namely proceeds better at higher temperatures.

This process is advantageously simplified due to the fact that all of the contaminated metal parts, and not just the radioactive elements exclusively, are subjected to an oxidation process. Since the radioactive elements adhere to the surfaces of the metal parts, complete oxidation of those elements is ensured. The fact that a relatively small part of the metal of which the metal parts themselves are formed is also oxidized in the process, does not impede the subsequent melt decontamination. The oxides of the elements then preferentially pass into the slag during the melting process.

The method according to the invention particularly brings the advantage of ensuring that the radioactive elements which are to be dissolved in the slag are present as oxides, having a solubility which, surprisingly, is greater in the slag than the solubility of the unoxidized elements. As a result, a significantly increased proportion of the elements which caused the contamination is advantageously removed from the metal melt. As a result, the metal melt and thus also shaped metal parts produced therefrom, for example, are substantially decontaminated. The shaped metal parts can then be used without limitations.

In accordance with another mode of the invention, the oxygen-containing atmosphere is dry or moist air. It is then advantageously unnecessary to provide any special oxygen-containing atmosphere.

In accordance with a concomitant mode of the invention, the period for which the metal parts are held in the oxygen-containing atmosphere at a temperature below the melting temperature of the metal parts, for the purpose of oxidation, is 10 minutes to 60 minutes long. Sufficiently complete oxidation of the radioactive elements is ensured in a period of this length.

The metal parts to be decontaminated may, for example, contain iron and/or copper.

Other steps which are considered as characteristic for the invention are set forth in the appended claims.

Although the invention is illustrated and described herein as embodied in a method for recycling contaminated metal parts, it is nevertheless not intended to be limited to the details given, since various modifications and structural changes may be made therein without departing from the spirit of the invention and within the scope and range of equivalents of the claims.

The method of operation of the invention, however, together with additional objects and advantages thereof will be best understood from the preceding description of specific embodiments and the following description of advantages.

The method according to the invention brings the advantage of ensuring that a significantly improved degree of decontamination of metal parts is achieved by using a melt decontamination. The shaped metal parts produced from the decontaminated metal melt can then be used without restrictions.

We claim:

1. A method for recycling metal parts contaminated by radioactive elements, which comprises:

oxidizing radioactive elements which form non-volatile oxides by holding contaminated metal parts in an oxygen-containing atmosphere for a period at a temperature below a melting temperature of the metal parts;

forming a melt and a slag from the metal parts after oxidizing the radioactive elements; and then separating the slag from the melt.

2. The method according to claim 1, which comprises carrying out the oxidizing step in dry air as the oxygen-containing atmosphere.

3. The method according to claim 1, which comprises carrying out the oxidizing step in moist air as the oxygen-containing atmosphere.

4. The method according to claim 1, which comprises setting the period to be between 10 minutes and 60 minutes long.

5. A method for recycling metal parts contaminated by α-emitters, which comprises:

oxidizing radioactive elements which form non-volatile oxides by holding metal parts contaminated by α-emitters in an oxygen-containing atmosphere for a period at a temperature below a melting temperature of the metal parts;

forming a melt and a slag from the metal parts after oxidizing the radioactive elements; and then separating the slag from the melt.

* * * * *